Sept. 16, 1969     J. E. LAMY     3,466,881
METHOD OF LAYING UNDERWATER PIPES AND EQUIPMENT FOR SAID METHOD
Filed Aug. 27, 1965     3 Sheets-Sheet 1
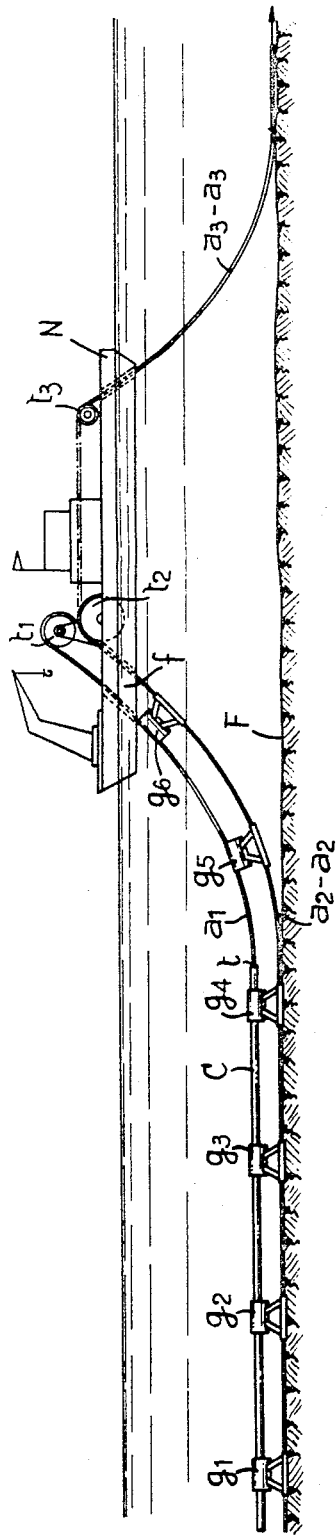

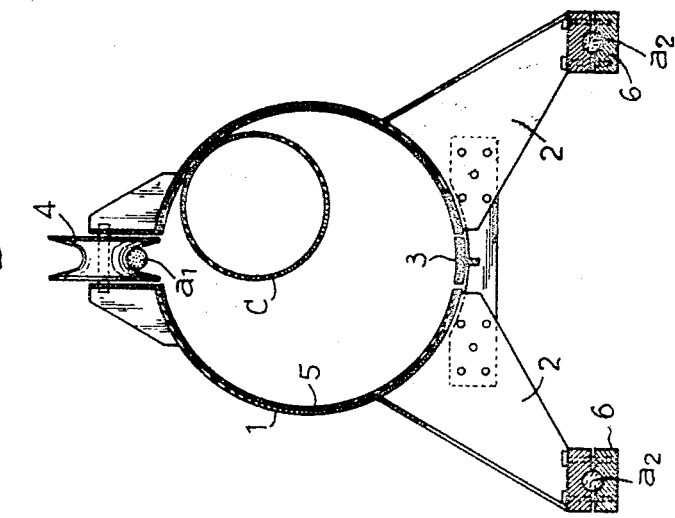
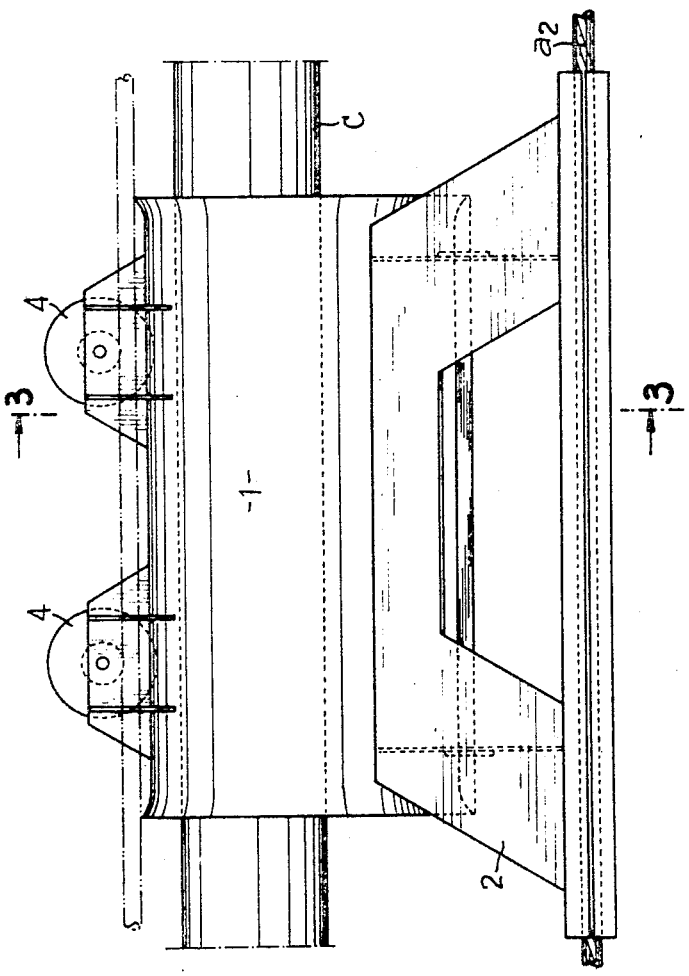

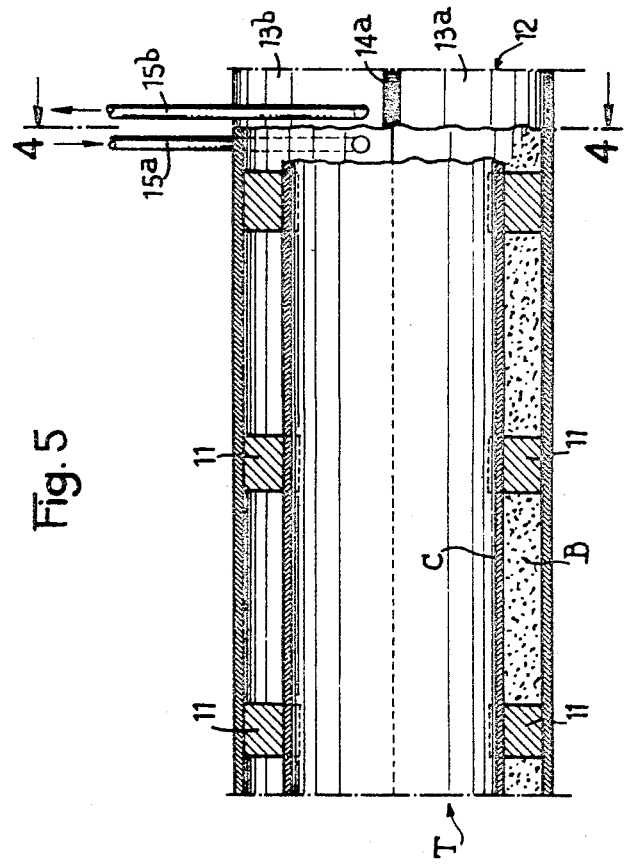
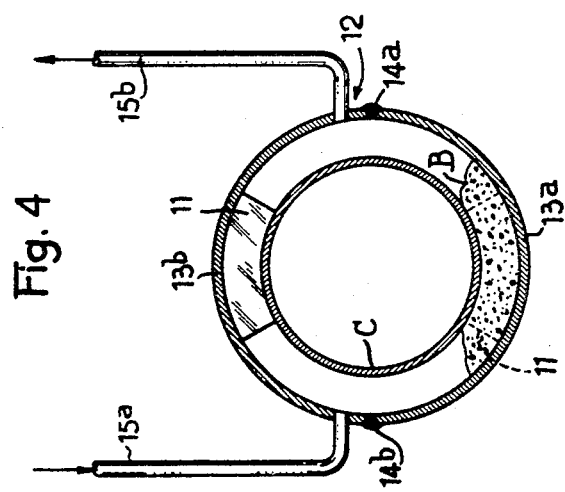

United States Patent Office 3,466,881
Patented Sept. 16, 1969

3,466,881
METHOD OF LAYING UNDERWATER PIPES AND EQUIPMENT FOR SAID METHOD
Jacques Edouard Lamy, Fontenay-aux-Roses, France, assignor to Societe d'Etude du Transport et de la Valorisation des Gaz Naturels du Sahara "S.E.G.A.N.S.," Paris, France, a French body corporate
Filed Aug. 27, 1965, Ser. No. 483,112
Claims priority, application France, Sept. 1, 1964, 986,770; Aug. 11, 1965, 27,951
Int. Cl. B63b *35/04;* F16l *1/00*
U.S. Cl. 61—72.3   13 Claims

ABSTRACT OF THE DISCLOSURE

Method and equipment for laying a conduit on an underwater bed by attaching the conduit at intervals to a cable and laying the conduit by exerting a traction on the cable, the cable thereafter acting as a ballast for the conduit, the connection between the cable and the conduit being such that the conduit is spaced away from the bed whereas the cable lies on the bed.

---

Several methods of laying underwater pipes by traction along the bed are known and in particular the methods described in French Patents Nos. 1,222,669 of January 19, 1959, and 1,254,942 of January 11, 1960.

It is known that cross currents exert on a pipe lying on the bed a vertical lifting force and a horizontal drag force normal to the pipe. A method for reducing these effects and in particular the lifting force, has been described in French Patent No. 1,343,651 of October 8, 1962.

The applicant has noticed that in the case of a pipe or conduit which has a circular cross-section and is sufficiently spaced away from the underwater bed the lift is practically nil. On the other hand, the drag can reach high values. For example, in respect of an immersed conduit having a circular cross-section of 700 mm. outside diameter and for a cross current of 1 knot, the drag value can be of the order of 7 kg. per linear metre.

The object of the present invention is to take advantage of the fact that the lift force exerted on an immersed conduit spaced from the bed is practically nil so as to provide a new method of laying an underwater pipe by traction.

Said method comprises maintaining the conduit at a distance from the bed by means of ballast so calculated as to resist the effect of cross currents.

This ballast can be in particular a cable resting on the bed, the conduit having a slightly positive buoyancy and being connected to said cable at intervals and the traction force being applied to said cable which thus constitutes both a ballast element and a traction element. However, if a mean value of about 0.7 is assumed for the mean coefficient of longitudinal friction of the cable on the bed, and bearing in mind the necessary ballasting, this solution (which is covered by the invention) requires in certain cases, and in particular for a large span or run of pipe, very high traction force.

Another object of the invention is to considerably reduce the required traction force. In this preferred embodiment, the conduit is partly disconnected from the ballast elements therefor so that the connection between the conduit and the ballast elements restricts the transverse displacements of the conduit but allows the latter complete freedom for the longitudinal translation thereof, the traction force is exerted on the conduit and the ballasting is laid as the laying of said conduit proceeds, said ballast elements having no part in the traction force exerted on the conduit. In this way the traction force is considerably reduced.

In this manner of carrying out the invention the buoyancy can be positive or negative.

Another object of the invention is to provide ballasting means during manufacture on the ground manufacturing site and/or after laying the conduit on the sea bed.

According to this manner of carrying out the invention, said conduit is surrounded with a coaxial sheath providing an annular space around the conduit and this space is filled with a certain amount of ballast before and/or after the laying of the conduit. This ballast could be in particular concrete.

Another object of the invention is to provide equipment for carrying out the method according to the preferred manner of carrying out the invention, said equipment comprising a series of guide tubes surrounding said conduit at approximately equally spaced distances of about L metres, each of said guide tubes having a weight which is so calculated as to remain stable when it is subjected to a force exerted along a length of L metres of conduit which is subjected to a cross current, the inside diameter of said tube being distinctly greater than the outside diameter of the conduit and each of said tubes being carried by a rigid foot or base which permits maintaining the conduit passing through the guide tubes at a distance from the bed.

Further features and advantages of the invention will be apparent from the ensuing description with reference to the accompanying drawings to which the invention is in no way limited.

In the drawings:

FIG. 1 shows the principle of laying a ballasted conduit by means of guide tubes.

FIG. 2 is a longitudinal elevational view of a guide tube.

FIG. 3 is a sectional view along line 3—3 of FIG. 2.

FIG. 4 is a partial longitudinal sectional view of a section of conduit providing with the sheath in which ballast can be introduced before and/or after the conduit has been laid, and FIG. 5 is a sectional view taken along line 5—5 of FIG. 4.

The method illustrating FIG. 1 has for object to lay on an underwater or sea bed F a conduit C by means of a ship or lighter N. For this purpose, there is employed, on one hand, a series of guide tubes $g_1, g_2 \ldots g_6 \ldots$ etc., spaced even distances apart, for example at 50 m. from each other, and on the other, a traction cable $a_1$ one end of which is adapted to be secured to the head $t$ of the conduit C; two parallel connection cables $a_2, a_2$ are fixed to the guide tubes by any suitable means at any points of said guide tubes, for example to the base of the guide tubes as shown in the drawing.

The ship N is specially adapted for laying said cables. It can comprise in particular a pit $f$, a winch $t_1$ around which is wound the traction cable $a_1$, and two reels $t_2$ unwinding the two cables $a_2, a_2$.

The ship can haul on one or two hauling cables $a_3$ wound round a winch $t_3$.

From the shore the series of guide tubes is disposed over a certain distance D (for example 3 km.).

The guide tubes are placed in spaced relation (50 m. apart) and in correct orientation by the two connection cables $a_2$, $a_2$ let out by the reels $t_2$ and on which is exerted a certain tension. These cables $a_2$, $a_2$ are clamped in each guide tube by any suitable means, for example by cattels (not shown).

The cable $a_1$ is first fixed to the shore at one end and acts as a support for laying the first guide tubes which, being secured to the cables $a_2$, $a_2$ slide along the cable $a_1$. The latter thus performs the function of a cable railway. When this cable $a_1$ has been unwound a distance D (for example 3 km.) it is disconnected from the ground and fixed at its end to the head $t$ of the conduit C. This cable $a_1$ when it is drawn along by the winch $t_1$ and winds round the latter, causes the conduit to travel inside the guide tubes.

This cable $a_1$ under the effect of its own weight, the weight of the guide tubes and that of the cables $a_2$, $a_2$ and furthermore subject to the traction force assumes the shape of a catenary from the ship. When this catenary assumes the extreme position for the depth of the region tangent to the underwater bed, the traction force is stopped.

Thenceforth, the ship hauls on the cable $a_3$, $a_3$ fixed to anchoring means, the hauling being achieved by means of the winch $t_3$. Under the action of this hauling the ship travels seawards.

The laying can then proceed in two ways.

In a first way, said cable $a_1$ is held at a fixed length so that the conduit C advances as the ship advances, hauling on the cables $a_3$, $a_3$.

The forward movement of said conduit therefore follows the forward movement of the hauling ship and is only affected by the execution of the connecting welds of the various sections of conduit on the prelaunching site. The ship and the conduit therefore move forward together.

In a second way of laying the conduit, the cable $a_1$ is let out continuously by the winch $t_1$ at a length equal to the forward movement of the ship so as to leave the conduit C fixed in position during a given forward movement of the ship, for example 2 or 3 km. The ship is then stopped and the cable $a_1$ which was unwound during the forward movement of the ship by the winch $t_1$ a length equal to said forward movement of the ship while said conduit C remained fixed in position, is then wound onto the winch $t_1$ over a length equivalent to said forward movement of the ship thus causing the conduit C to move forwardly inside the guide tubes a corresponding distance. This way of laying the conduit is only effected by the possibilities of the ground site as concerns the lengths of sections to be connected to the conduit C (normally by welding).

When the traction thus exerted on the cable $a_1$ has moved the conduit C forwardly a distance equal to the distance travelled through previously by the ship hauling on the cables $a_3$, $a_3$ under the action of the winch $t_3$, the hauling of the ship on the cables $a_3$, $a_3$ can then resume, the ship and the conduit moving forwardly in this method alternately and in succession.

In both these ways of laying the conduit, as the ship moves forwardly the cables $a_3$, $a_3$ acting as hauling cables are normally recovered on the ship after winches $t_3$, sent to the reels $t_2$ and put back into the water on the side adjacent the cables $a_2$, $a_2$. In fact, each of the cables $a_3$ constitutes therefore with the corresponding cable $a_2$ a single cable, the guide tubes being fixed to said pair of cables.

FIGS. 2 and 3 show an embodiment of a guide tube through which extend the cable $a_1$ and the conduit C. The guide tube is fixed to the cables $a_2$, $a_2$.

This guide tube comprises a shell 1 having a diameter distinctly greater, for example twice as large as the diameter of the conduit, mounted on two supports 2, 2 which are spaced such distance apart as to impart good stability to the guide tube. The shell has at its lower part an opening through which the cable $a_1$ can be introduced, this opening being subsequently closed by a closing element 3. Preferably, one or two sheaves 4 are provided on the upper part of the shell so that the guide tube can roll along the cable $a_1$ (acting as a cable railway) for placing the guide tube on the underwater bed.

This shell is provided internally with a lining 5 of plastics material which reduces to a very low value (for example at the most 0.15) the coefficient of friction when the conduit C slides in the guide tube.

In this embodiment, the two cables $a_2$ are clamped by means of cable clamps 6, 6 against the bases of the support.

To employ these means, the conduit is so ballasted as to have at the most only a slight buoyancy, equal for example to 5–10 kg. per linear metre. For this purpose, the conduit can comprise a double sheath between the walls of which is disposed a material regulating the buoyancy.

Under these conditions, the forces exerted on the conduit correspond to a resultant force the normal value of which remains low, of the order of about 12 kg. per linear metre for a cross current of 1 knot in the case of a conduit having an outside diameter of 700 mm. As the guide tubes are in the selected embodiment disposed 50 m. apart, the resultant force exerted on each guide tube normal to the cylindrical surface is therefore only of low value.

The sum of these forces exerted along the line of the conduit gives at each point the value of the traction force required to be exerted on the conduit, bearing in mind the coefficient of friction between the conduit and the guide tubes which is rendered very low due to the interposition of the lining in each guide tube.

Apart from their function of laying and orienting the guide tubes, the cables $a_2$, $a_2$ also have a function of additional means stabilizing the guide tubes which affords additional safety.

The method and equipment according to the invention disassociate the traction force and the ballasting of the conduit and this permits, owing to the reduction in the friction force of the conduit, employing relatively low traction forces capable of being exerted by small-diameter cables.

The equipment of the tractor ship or lighter therefore presents no particular problem since the ship can be equipped with conventional winches.

Further, the method according to the invention permits employing a conduit composed of thinner tubing and as the conduit is held away from the underwater bed a relatively great distance for example several decimetres, this conduit is free from any hazards due to local irregularities of the profile of the bed.

The method according to the invention is applicable to any depth and any cross current values. As concerns conduits spans or runs of great length, the method is applicable even to non rectilinear lay-outs.

The guide tube can have an inside shape which permits wedging the conduit in the guide tube either laterally in the case of a preponderance of cross currents, or vertically at the lower part of the guide tube in the case of a preponderance of the weight of the assembly of the conduit and the fluid conducted therein. This wedging of the conduit can be obtained, for example, by a judicious inside shape of the guide tube, such as a generally elliptical shape in which the curvature is replaced by an angular shape in the vicinity of the two ends of the major axis (the latter being horizontal) of the elliptical section, and of the lower end of the minor axis of said elliptical section, said angular shape forming a dihedron affording wedging surfaces for wedging the conduit and holding it stationary in the guide tube.

In the embodiment shown in FIGS. 4 and 5, a section T of a conduit is provided with blocks 11, for example in the form of a segment of a circle disposed a suitable distance apart from each other. A sheath or case 12 coaxially surrounds the section T and rests on the outer curved of the blocks 11. The case 12 comprises two half-shells 13a, 13b welded together along their longitudinal joint lines 14a, 14b.

Two pipes 15a, 15b are provided for putting the annular space between the section T and the case 12 in communication with the exterior. One pipe is provided for pouring concrete in the annular space and the other for discharging the air expelled from the space by the poured concrete. For this purpose, these pipes are respectively connected to flexible pipes, ones of thsee flexible pipes putting the pipe 15a in communication with a concrete-pouring device on the ship N which operates after the conduit has been laid, and the other flexible pipe leading to above the level of the water and being open to the atmosphere.

The following procedure is adopted. On the ground manufacturing site a half-shell 13a is placed on suitably spaced cradles (not shown). Vertically above each cradle a block 11 is placed in the lower shell 13a. The conduit C provided with its protective coating is thereafter placed on these lower blocks 11 and upper blocks 11 are placed on the conduit C at suitable distance apart and in vertical alignment with the lower blocks. An amount of concrete B can now be poured into the lower half-shell 13a, thereafter, the upper half-shell 13b is placed on the upper blocks 11 and the two half-shells 13a, and 13b are welded together and the case 12 thus formed checked for fluid tightness.

The conduit assembly thus obtained is then placed in the water as explained hereinbefore, the case 12 formed by the half-shells being continuous and, of course, surrounding the conduit C throughout its length.

When the conduit assembly thus obtained is placed in the sea, the annular space between the conduit C and the sheath 12 is filled, for example by pumping an amount of concrete by means of one or several pipes, such as 15a, the air escaping by way of the pipes 15b.

It will be observed that in the case of relatively shallow depths, the conduit C can be sunk to the bottom, the opening provided at the base of the guide tubes not being closed by the closing element 3 so that when the conduit has been laid these guide tubes can be recovered.

When the conduit has been hauled over the required length, iti s ballasted by any suitable means, for example simply by filling it with the fluid to be conducted. In this way, it acquires a negative buoyancy and leaves the guide tubes through the opening provided at the base thereof and sinks to the bottom for example in a trench or impression formed by suitable means. In this case the conduit can be buried.

It is possible, if this is desired, to bury the conduit C with the guide tubes.

Although specific embodiments of the invention have been described, many modifications and changes may be made therein without departing from the scope of the invention as defined in the appended claims.

Having now described my invention what I claim as new and desire to secure by Letters Patent is:

1. Method of laying a conduit on an underwater bed by traction exerted on the conduit comprising attaching at fixed spacing intervals ballast elements to said conduit as laying of the latter proceeds so as to maintain the conduit at a distance from the bed, said ballast elements allowing longitudinal movement of said conduit relative thereto while limiting transverse movement of said conduit and being fixed relative to said underwater bed after being placed in position thereon, the conduit being advanced longitudinally relative to said elements by means of a traction cable fixed at the free end of said conduit.

2. Method as claimed in claim 1, wherein the buoyancy of the conduit is regulated at a slightly positive value.

3. Method as claimed in claim 1, wherein the ballast is in the form of ballasted guide tubes encompassing said conduit, the inside diameter of the guide tubes being distinctly greater than the outside diameter of the conduit.

4. Method as claimed in claim 3, wherein said guide tubes are coated internally with a lining of plastics material so as to reduce the frictional force between the conduit and the guide tubes.

5. Method as claimed in claim 3, wherein the positioning of the guide tubes as concerns orientation and spacing is ensured by means of two parallel connection cables fixed to the guide tubes and on which a traction is exerted.

6. Method as claimed in claim 3, wherein the guide tubes are placed on the bed by causing them to slip from a ship along a traction cable acting as a cable railway for laying the guide tubes.

7. Method as claimed in claim 3 comprising: as the start of the laying, fixing said traction cable to the ground and letting it out over a given length by a ship, placing guide tubes in position at fixed spacing intervals so as to allow axial movement of said guide tubes relative to said traction cable, disconnecting said cable from the ground and fixing it to the end of the conduit, so as to serve to draw the conduit through the guide tubes, stopping the traction when the catenary formed by the traction cable is at its extreme position so as to be tangent to the bed, hauling said ship along by hauling cables and repeatedly placing further guide tubes in position at fixed spacing intervals so as to allow axial movement of said guide tubes relative to said traction cable, drawing said conduit through further guide tubes, stopping the traction when the catenary formed by the traction cables is at its extreme position so as to be tangent to the bed and hauling said ship by hauling cables, these steps being repeated until the ultimate length of said conduit is reached.

8. Method as claim in claim 7, wherein the traction cable has a fixed length during the forward movement of the ship, the conduit following the latter during its forward movement.

9. Method as claimed in claim 7, wherein the traction cable is unwound during the forward movement of the ship, then wound up each time the ship stops so as to move the conduit through the guide tubes a length approximately equal to the forward movement of the ship.

10. Method as claimed in claim 7, wherein as the ship moves forwardly the recovered hauling cables are placed back into the water on the upstream side if the ship and provided with guide tubes at fixed intervals so as to form connection cables, each of the hauling cables constituting with the corresponding connection cable one and the same cable which is anchored at a point spaced away from the leading end of the ship with respect to the forward movement of the ship and is provided with guide tubes at the rear of the ship.

11. Method as claimed in claim 7 wherein the buoyancy of the conduit is regulated at a slightly positive value.

12. Equipment for laying a conduit on an underwater bed by traction exerted on the conduit, comprising a series of approximatley equally spaced guide tubes surrounding the conduit, each of the guide tubes having a weight which is so calculated as to remain stable when it is subjected to the force exerted by a length of conduit comprised between two successive guide tubes and subjected to a cross current, the inside diameter of the guide tube being distinctly greater than the outside diameter of the conduit, each of the guide tubes having a base which maintains the conduit extending through the guide tubes at a distance from the bed, the equipment further comprising a traction cable for connection to the end of the conduit to be laid, two hauling cables anchored at one end, two connection cables connected to the bases of the guide tubes so as to maintain the equal spacing between said guide tubes, said connection cables being further connected to the hauling cables, and a ship adapted to be hauled along the hauling cables, the ship comprising a winch for the traction cable, reels for the connection cables, winches for the hauling cables and motors for driving the winches and reels.

13. Equipment as claimed in claim 12, wherein each hauling cable constitutes with the corresponding one of the connection cables a single hauling and connection cable, the ship being hauled by means of the combined cables and the latter being equipped with the guide tubes at the trailing end of the ship as the ship moves forwardly.

References Cited

UNITED STATES PATENTS

| Re. 23,963 | 3/1955 | Collins | 61—72.4 |
| 2,910,835 | 11/1959 | Timothy | 61—72.3 |
| 3,136,133 | 6/1964 | Perret | 61—72.3 |

FOREIGN PATENTS

| 922,919 | 4/1963 | Great Britain. |
| 904,854 | 8/1962 | Great Britain. |
| 483,754 | 10/1929 | Germany. |

EARL J. WITMER, Primary Examiner